US00RE38778E

(19) United States
(12) Reissued Patent
Eggert et al.

(10) Patent Number: US RE38,778 E
(45) Date of Reissued Patent: Aug. 23, 2005

(54) MAGNETIC BIT HOLDER AND HAND TOOL INCORPORATING SAME

(75) Inventors: Daniel M. Eggert, Kenosha, WI (US); Frank Mikic, deceased, late of Lake Geneva, WI (US); Daniel J. Garramone, legal representative, Deerfield, IL (US)

(73) Assignee: Snap-on Incorporated, Pleasant Prairie, WI (US)

(21) Appl. No.: 09/110,145

(22) Filed: Jul. 2, 1998

Related U.S. Patent Documents

Reissue of:
(64) Patent No.: 5,577,426
Issued: Nov. 26, 1996
Appl. No.: 08/335,992
Filed: Nov. 8, 1994

(51) Int. Cl.[7] ..... B25B 23/00
(52) U.S. Cl. ..... 81/439; 81/125
(58) Field of Search ..... 81/432–439, 125; 279/128, 9.04–9.1, 102; 269/8

(56) References Cited

U.S. PATENT DOCUMENTS

| | | | |
|---|---|---|---|
| 2,550,775 | A | 5/1951 | Clark |
| 2,624,223 | A | 1/1953 | Clark |
| 2,671,369 | A | 3/1954 | Clark |
| 2,677,294 | A | 5/1954 | Clark |
| 2,678,578 | A | 5/1954 | Bonanno |
| 2,697,642 | A | 12/1954 | Rudy |
| 2,718,806 | A | 9/1955 | Clark |
| 2,720,804 | A | 10/1955 | Brown |
| 2,750,828 | A | 6/1956 | Wendling |
| 2,758,494 | A | 10/1956 | Jenkins |
| 2,806,396 | A | 9/1957 | Miller |
| 2,808,862 | A | 10/1957 | Simkins |
| 3,007,504 | A | 11/1961 | Clark |
| 3,145,595 | A | 8/1964 | Mauck |
| 3,165,950 | A | 1/1965 | Gooley et al. |
| 3,207,010 | A | 9/1965 | Wendling |
| 3,240,087 | A | 3/1966 | Estes |
| 3,320,563 | A | 5/1967 | Clark |
| 3,630,108 | A | 12/1971 | Stillwagon, Jr. |
| 3,707,894 | A | 1/1973 | Stillwagon, Jr. |
| 4,235,269 | A | 11/1980 | Kraus |
| 4,663,998 | A | 5/1987 | Parsons et al. |
| 4,924,733 | A | 5/1990 | McKenzie |
| 5,163,345 | A | 11/1992 | Doan et al. |
| 5,199,334 | A | 4/1993 | Vasichek et al. |
| 5,210,895 | A | 5/1993 | Hull et al. |
| 5,259,277 | A | 11/1993 | Zurbuchen |
| 5,266,914 | A | 11/1993 | Dickson et al. |
| 5,277,088 | A | 1/1994 | Vasichek et al. |
| 5,309,799 | A | 5/1994 | Jore |

*Primary Examiner*—Debra S Meislin
(74) *Attorney, Agent, or Firm*—Sayfarth Shaw LLP

(57) ABSTRACT

A hand tool has an elongated shank with a handle at one end and a bit holder at the other end, the bit holder including a cylindrical body having a distal end surface and an axis, the body having an axial bore formed in the end surface of non-circular transverse cross section and terminating at an inner end surface. A neodymium permanent magnet is freely received in the bore and retained against the inner end surface by a thin circular retainer, formed of metal or plastic, which is interference-fitted in the bore. Both flat, disk-like and concave, bowl-shaped retainers are disclosed. A shock-absorbing cushion may be disposed between the magnet and the inner end surface of the bore. A bit formed of magnetizable material is mateably received in a socket portion of the bore and retained in place by the magnet. The portion of the bore receiving the magnet may have a different cross section from the socket portion. The magnet may be disposed in an encapsulation which interference fits in the bore.

22 Claims, 1 Drawing Sheet

MAGNETIC BIT HOLDER AND HAND TOOL INCORPORATING SAME

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to hand tools and, in particular, to tools incorporating a bit holder for receiving interchangeable bits, such as screwdriver bits or the like. The invention has particular application to tools in which bits are magnetically retained in a bit holder.

2. Description of the Prior Art

Typical current magnetic bit holders include a cylindrical body having a socket formed axially in one end thereof for mateably receiving an associated bit. The inner end surface of the socket has further formed therein an axial hole of reduced cross section receiving an associated magnet to retain the bit in place in the socket. A suitable permanent magnet is press-fitted or crimped into the magnet hole for magnetically retaining the associated bit in place. The magnet is commonly formed of a material such as Alnico and has considerable mass, typically being approximately one inch long and approximately one-quarter inch in diameter.

Other permanent magnet materials, such as neodymium, have been provided which can afford greater magnetic holding power with significantly reduced magnet mass. However, neodymium magnets are extremely brittle and cannot be press fit or crimped, nor can they be impacted in use by a bit, since such handling may cause the magnet to fracture and separate from the tool.

SUMMARY OF THE INVENTION

It is a general object of the invention to provide an improved magnetic bit holder which avoids the disadvantages of prior bit holders while affording additional structural and operating advantages.

An important feature of the invention is the provision of a magnetic bit holder which obviates the drilling of a separate hole for retention of a permanent magnet.

A further feature of the invention is the provision of a bit holder of the type set forth, which can effectively use a neodymium magnet.

Yet another feature of the invention is the provision of a bit holder of the type set forth which can effectively retain a neodymium magnet in place, minimizing the risk of fracture thereof and assuring adequate retention even in the event of fracture.

Yet another feature of the invention is the provision of a hand tool incorporating a bit holder of the type set forth.

These and other features of the invention are attained by providing a bit holder comprising: a cylindrical body having a distal end surface and an axis, the body having formed in the end surface an axial bore terminating at an inner end surface, a permanent magnet received in the bore and having an outer surface, and retaining structure in contact with the outer surface of the magnet and interference fitted in the bore to retain the magnet in the bore, the bore having a portion of non-circular transverse cross section outboard of the retaining structure defining a bit-receiving socket.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
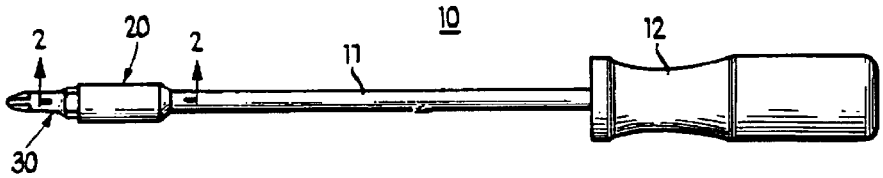
FIG. 1 a side elevational view of a hand tool incorporating a magnetic bit holder in accordance with the present invention, shown retaining an associated bit.

Referring to FIG. 1, there is illustrated a hand tool 10 having an elongated shank 11, provided at one end thereof with an enlarged handle 12 and provided at the other end thereof with a substantially cylindrical bit holder 20. The shank 11 and the bit holder 20 are preferably of unitary, one-piece construction, being formed of a suitable metal, while the handle 12 may be formed of any desirable material, such as wood, plastic or the like. The handle 12 may have an axial bore to receive the adjacent end of the shank 11 or, alternately, may be formed around the handle end of the shank 11, as by a suitable molding process, all in a known manner.

Figure 2:
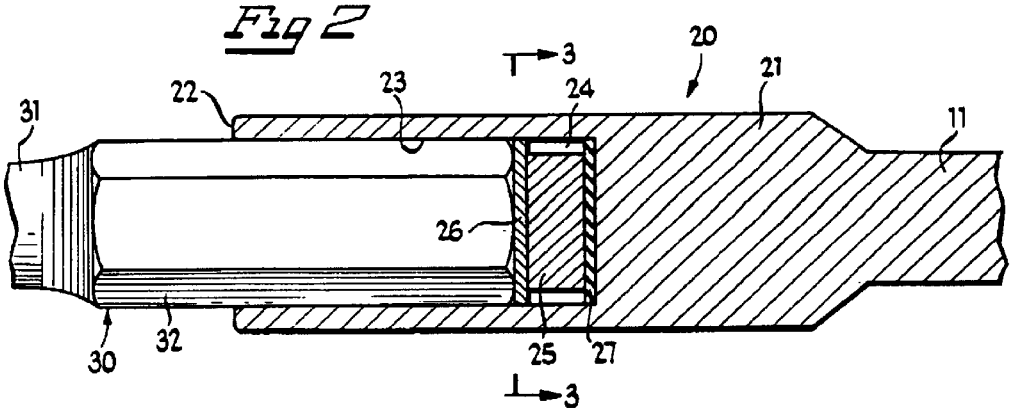
FIG. 2 is an enlarged fragmentary view in horizontal section taken along the line 2—2 in FIG. 1, and illustrating a cushion member for the permanent magnet and a bowl-shaped metal retainer therefor.
Figure 3:
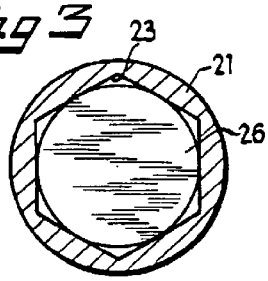
FIG. 3 is a further enlarged view in vertical section taken along the line 3—3 in FIG. 2.

Referring also to FIG. 2, the bit holder 20 includes a circularly cylindrical body 21 having a distal end surface 22 in which is formed an axial bore 23, which has a transverse cross-sectional shape which is non-circular, such as polygonal. Preferably, the bore 23 is hexagonal in transverse cross section. The bore 23 terminates at an inner end surface 24.

A permanent magnet 25 is freely received in the bore 23, the magnet 25 preferably being formed of a strong magnetic material, such as neodymium. The magnet 25 is preferably cylindrical in shape, having a diameter smaller than the across-sides width of the bore 23. It will be appreciated that the size of the magnet 25 shown in the drawing is simply for purposes of illustration and that the magnet may actually be quite small and still provide sufficient holding force to retain an associated bit.

In order to retain the magnet 25 in place, there is also provided a retainer 26 which is in the shape of a flat, circular disk, and may be formed of a suitable metal. The retainer 26 is dimensioned to be interference-fitted in the bore 23 against the outer surface of the magnet 25. Thus, it will be appreciated that the retainer 26 serves to effectively retain the magnet 25 in place against the inner end surface 24. The retainer 26 is as thin as possible, preferably 0.005 inch or less, so as to maximize the magnetic coupling force between the permanent magnet 25 and the associated bit. A shock-absorbing cushion 27, formed of rubber or other suitable shock-absorbing material, may be provided between the magnet 25 and the inner end surface 24 of the bore 23. This serves to cushion the brittle neodymium magnet 25 against shock. While the cushion 27 is preferably provided, it is not essential and could be dispensed with.

The portion of the bore 23 outboard of the retainer 26 defines a socket or cavity for receiving an associated bit 30. More specifically, the bit 30 has a working end 31, which may be in the nature of a screwdriver bit, such as a cross-tip bit, a flat blade bit or the like, and also includes a hexagonal end 32 shaped and dimensioned for mating engagement in the bore 23 for driven engagement therewith. As can be seen in FIG. 2, the hex end 32 of the bit 30 bottoms against the retainer 26 and is magnetically retained in place therein by the magnetic holding force of the permanent magnet 25.

It will be understood that, even in the event that the permanent magnet 25 should fracture with use, the retainer 26 will effectively serve to retain the magnet 25 in place and prevent escape of any magnet parts from the bore 23. It will be also understood that a significant aspect of the invention 0is that it obviates the drilling of an additional magnet-retaining hole in the body 21 of the bit holder 20, thereby reducing the fabrication costs.

Figure 4:
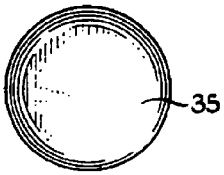
FIG. 4 is a top plan view of a flat, disk-like, plastic magnet retainer.
Figure 5:
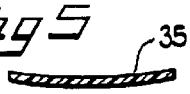
FIG. 5 is a sectional view taken along the line 5—5 in FIG. 4.

Referring now also to FIGS. 4 and 5, there is illustrated an alternative form of retainer, generally designated by the numeral 35, which is a generally bowl-shaped, circular retainer, which is preferably oriented in use with its convex side facing the magnet 25 and is also dimensioned to be press-fitted in the bore 23. The retainer 35 is illustrated as being formed of a suitable plastic material. It will be appreciated, however, that either of the retainers 26 or 35 could be formed or either metal or plastic. The bowl-shaped configuration of the retainer 26 also affords a certain flexible resilience, which can provide an additional cushioning effect to reduce the shock forces applied to the permanent magnet 25.

Figure 6:
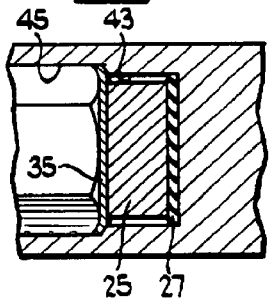
FIG. 6 is a view similar to FIG. 2 showing an alternative embodiment of the present invention.

Referring to FIG. 6, there is illustrated an alternative bit holder generally designated by the numeral 40, which is similar to the bit holder 20, described above, except for the nature of the bore therein. More specifically, the bit holder 40 has a cylindrical body 41 in which is formed an axial bore 43 terminating at an inner end surface 44. The bore 43 may have any desired cross-sectional configuration, but is preferably circularly cylindrical. The bore 43 is provided with an enlarged cross section counterbore 45 which is non-circular in transverse cross section, preferably being hexagonal.

In this embodiment, the magnet 25 is dimensioned to fit freely in the bore 43 and, again, the cushion 27 may or may not be provided. The retainer 26 (or the retainer 35) is then mounted in the counterbore 45 in the same manner as was described above in connection with FIG. 2, for retaining the magnet 25 in place.

Figure 7:
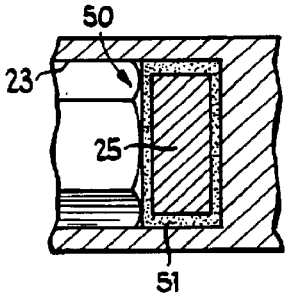
FIG. 7 is a view similar to FIG. 2 showing yet another embodiment of the present invention utilizing an encapsulated magnet.

Referring now to FIG. 7, there is illustrated another embodiment of the invention, utilizing an encapsulated magnet 50. More specifically, the magnet 25 is completely surrounded with an encapsulation 51. The thickness of the encapsulation 51 along the side of the magnet 25 is such as to provide an interference fit in the bore 23, so that the magnet may be retained in place without the use of the retainers 26 or 35. The thickness of the encapsulation 51 along the outer surface of the magnet 25 is such as to provide the necessary protection of the magnet 25 from shock as a result of contact with the bit 30. Also, it will be appreciated that, in the event that the magnet 25 is fractured, the encapsulation 51 will prevent the escape of any pieces of the magnet 25.

In the embodiment illustrated in FIG. 7, the encapsulation of the magnet is in the nature of a settable adhesive which may be deposited in liquid form around the magnet 25 in the bore. Thus, a thin layer of adhesive could first be deposited in the bore and the magnet set thereon and then the remainder of the adhesive flowed around the sides and outer surface of the magnet. Alternatively, the magnet could be set on the end surface of the bore and then adhesive flowed around the magnet in the manner described above. After the adhesive has set, it serves not only to retain the magnet in the bore 23 of the bit holder 20 or the bore 43 of the bit holder 40, but would also provide a buffering protective layer between the magnet and the associated bit 30.

Figure 8:
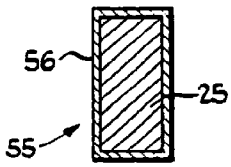
FIG. 8 is a sectional view of the encapsulated magnet of FIG. 7.

While, in the embodiment of FIG. 7, the encapsulation of the magnet is provided in situ in the bore, it will be appreciated that the encapsulation could be provided before the magnet is inserted in the bore of the bit holder. Referring to FIG. 8, there is illustrated another embodiment of an encapsulated magnet 55, wherein the magnet 25 is completely surrounded with an encapsulation 56, which may be formed of any suitable material, including plastic, rubber, brass or the like, but for purposes of illustration is shown as having a metal encapsulation. The dimensions of the encapsulation 56 may be similar to that of the encapsulation 51 of FIG. 7 and for the same reasons. In this case, the prefabricated encapsulated magnet 55 is press-fitted into the bore 23, the encapsulation 56 protecting the magnet 25 from fracture during the press-fitted insertion.

Figure 9:
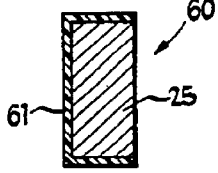
FIG. 9 is a view similar to FIG. 8 showing a partially-encapsulated magnet.

Referring to FIG. 9, there is an alternative embodiment of the encapsulated magnet, generally designated by the numeral 60, which utilizes encapsulation 61 covering only the outer and side surfaces of the magnet 25. If desired, any of the magnets 50, 55 or 60 could be used together with the cushion 27 between the magnet and the end surface of the bore. Also, while the encapsulated magnet has been illustrated as mounted in the bore 23 of the bit holder 20, it will be appreciated that it could also be disposed in the bore 43 of the bit holder 40.

From the foregoing, it can be seen that there has been provided an improved bit holder and a hand tool incorporating same, which afford the improved magnetic holding ability of a neodymium magnet, while at the same time minimizing risk of fracture of the magnet, and assuring retention of the magnet in place, even in the event of fracture.

We claim:

1. A bit holder comprising: a cylindrical body having a distal end surface and an axis, said body having formed in said end surface an axial bore terminating at an inner end surface, a permanent magnet received in said bore and having an outer surface, and retaining structure in contact with the outer surface of said magnet and interference fitted in said bore to retain said magnet in said bore, said bore having a portion of non-circular transverse cross section outboard of said retaining structure defining a bit-receiving socket, said retaining structure including a discrete retaining member friction fitted in said bore outboard of said magnet, said retaining member being generally bowl-shaped and convex toward said magnet, said retaining member and said inner end surface cooperating to retain said magnet therebetween.

2. The bit holder of claim 1, wherein said magnet is formed of neodymium.

3. The bit holder of claim 1, wherein said magnet has a transverse cross-sectional size smaller than the cross-sectional size of said bore so as to be freely receivable in said bore.

4. The bit holder of claim 1, wherein said retaining structure is formed of metal.

5. The bit holder of claim 1, wherein said retaining structure is formed of plastic.

6. The bit holder of claim 1, and further comprising a cushioning member discrete from said magnet and disposed between said magnet and said inner end surface.

7. The bit holder of claim 1, wherein said portion of said bore defining said socket comprises a counterbore having a cross-sectional size larger than that of the remainder of said bore.

8. The bit holder of claim 7, wherein said retaining structure is disposed in said counterbore.

9. The bit holder of claim 1, wherein said bore has the same cross section along its entire length.

10. In combination with the bit holder of claim 1, a bit having a transverse cross section such as to be mateably receivable in said socket in driven engagement with said body.

11. A hand tool comprising: an elongated shank having a handle end and a working end and a longitudinal axis, a cylindrical body at said working end having a distal end surface, said body having formed in said end surface an axial bore terminating at an inner end surface, a permanent magnet received in said bore and having an outer surface, and retaining structure in contact with the outer surface of said magnet and interference fitted in said bore to retain said magnet in said bore, said bore having a portion outboard of said retaining structure of non-circular transverse cross section defining a bit-receiving socket, said retaining structure including a discrete retaining member friction fitted in said bore outboard of said magnet, said retaining member being generally bowl-shaped and convex toward said magnet, said retaining member and said inner end surface cooperating to retain said magnet therebetween.

12. The hand tool of claim 11, wherein said magnet is formed of neodymium.

13. The hand tool of claim 11, wherein said portion of said bore defining said socket comprises a counterbore having a cross-sectional size larger than that of the remainder of said bore.

14. The hand tool of claim 11, wherein said bore has the same cross section along its entire length.

*15. A bit holder comprising:*

*a body having a distal end surface,*

*said body having a bore formed in said end surface,*

*a magnet received in said bore and having an outer surface,*

*and a discrete retaining member friction fitted in said bore outboard of said magnet and substantially covering said outer surface of said magnet to retain said magnet in said bore,*

*said bore having a portion outboard of said retaining member defining a bit-receiving socket.*

*16. The bit holder of claim 15, wherein said magnet is a permanent magnet.*

*17. The bit holder of claim 15, wherein the portion of said bore outboard of said retaining member is non-circular in transverse cross section.*

*18. The bit holder of claim 15, wherein said retaining member is generally bowl-shaped and convex toward said magnet.*

*19. The bit holder of claim 15, wherein said body has an axis of rotation extending through said end surface, said bore being formed axially in said end surface.*

*20. The bit holder of claim 15, wherein said bore terminates at an inner end surface, said retaining member cooperating with said inner end surface to retain said magnet therebetween.*

*21. The bit holder of claim 15, wherein said retaining member is a substantially circular disk.*

*22. A bit holder comprising:*

*a body having a distal end surface,*

*said body having a bore formed in said end surface,*

*a magnet received in said bore and having an outer surface,*

*and a discrete retaining member friction fitted in said bore outboard of said magnet to retain said magnet in said bore,*

*said retaining member having a continuous outer periphery such that any two points on the periphery can be joined by a straight line segment which does not extend outside the periphery,*

*said bore having a portion outboard of said retaining member defining a bit-receiving socket.*

* * * * *